(12) United States Patent
Tesanovic

(10) Patent No.: US 11,395,316 B2
(45) Date of Patent: *Jul. 19, 2022

(54) METHOD AND APPARATUS FOR SCHEDULING REQUEST IN WIRELESS COMMUNICATION SYSTEM

(71) Applicant: Samsung Electronics Co., Ltd, Suwon-si (KR)

(72) Inventor: Milos Tesanovic, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

This patent is subject to a terminal disclaimer.

(21) Appl. No.: 16/680,391

(22) Filed: Nov. 11, 2019

(65) Prior Publication Data

US 2020/0084785 A1 Mar. 12, 2020

Related U.S. Application Data

(63) Continuation of application No. 16/002,914, filed on Jun. 7, 2018, now Pat. No. 10,477,569.

(30) Foreign Application Priority Data

Jun. 7, 2017 (GB) .................................. 1709070

(51) Int. Cl.
*H04W 4/00* (2018.01)
*H04W 72/12* (2009.01)
*H04W 24/08* (2009.01)

(52) U.S. Cl.
CPC ... *H04W 72/1268* (2013.01); *H04W 72/1284* (2013.01); *H04W 24/08* (2013.01)

(58) Field of Classification Search
CPC ......... H04W 72/1268; H04W 72/1284; H04W 24/08; H04W 72/12

(Continued)

(56) References Cited

U.S. PATENT DOCUMENTS

2015/0043547 A1 2/2015 Pelletier et al.
2016/0295607 A1* 10/2016 Vajapeyam ........... H04W 24/08

(Continued)

FOREIGN PATENT DOCUMENTS

WO 2016/032077 A1 3/2016
WO 2017/212314 A1 12/2017
WO 2018/202332 A1 11/2018

OTHER PUBLICATIONS

Huawei, "SR triggering and cancellation", R2-1705196, May 15-19, 2017 (From Applicant's IDS). (Year: 2017).*

(Continued)

*Primary Examiner* — Mang Hang Yeung

(57) ABSTRACT

The present disclosure relates to a pre-5$^{th}$-Generation (5G) or 5G communication system for supporting higher data rates Beyond 4$^{th}$-Generation (4G) communication system such as Long Term Evolution (LTE). The present disclosure includes a method and apparatus for scheduling request in wireless communication system. According to various embodiments of the present disclosure, a method of a user equipment (UE) in a wireless communication system comprises determining a scheduling request (SR) configuration among a plurality of SR configurations based on a network condition, and transmitting an SR associated with the determined SR configuration. Each of the plurality of SR configurations corresponds to at least one logical channel (LCH).

24 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0070378 A1 | 3/2018 | Quan et al. | |
| 2018/0139030 A1 | 5/2018 | Kim et al. | |
| 2018/0176937 A1* | 6/2018 | Chen | H04W 74/085 |
| 2018/0279331 A1* | 9/2018 | Shaheen | H04W 72/1205 |
| 2018/0324844 A1* | 11/2018 | Babaei | H04W 74/0833 |

OTHER PUBLICATIONS

Supplementary European Search Report in connection with European Application No. 18813572.7 dated Apr. 14, 2020, 4 pages.
Huawei, et al., "SR triggering and cancellation," R2-1705198, 3GPP TSG-RAN WG2 #98, Hangzhou, China, May 15-19, 2017, 3 pages.
3GPP TS 36.321 V14.2.1 (Mar. 2017), Technical Specification, 3rd Generation Partnership Project; Technical Specification Group Radio Access Network; Evolved Universal Terrestrial Radio Access (E-UTRA); Medium Access Control (MAC) protocol specification (Release 14), Mar. 2017, 106 pages.
International Search Report dated Sep. 27, 2018 in connection with International Patent Application No. PCT/KR2018/006335.
Written Opinion of the International Searching Authority dated Sep. 27, 2018 in connection with International Patent Application No. PCT/KR2018/006335.
Nokia et al., "SR for NR", 3GPP TSG-RAN WG2 Meeting #98, May 15-19, 2017, 2 pages, R2-1705074.
LG Electronics Inc., "SR enhancement for New RAT", 3GPP TSG-RAN WG2 Meeting #98, May 15-19, 2017, 2 pages, R2-1705238.
Intel Corporation, "Enhancement of SR/BSR", 3GPP TSG RAN WG2 Meeting #98, May 15-19, 2017, 5 pages, R2-1704784.
Vivo, "Enhanced SR in NR", 3GPP TSG-RAN WG2 Meeting #98, May 15-19, 2017, 3 pages, R2-1704589.
Combined Search and Examination Report under Section 17 & 18(3) dated Oct. 24, 2017 in connection with United Kingdom Patent Application No. GB1709070.5, 5 pages.
Ericsson, "SR signalling content in NR," R2-1704375, 3GPP TSG-RAN WG2 #98, Hangzhou, P.R. of China, May 15-19, 2017, 3 pages.
Samsung, "Resource allocation for PUCCH with SR," R1-1708011, 3GPP TSG RAN WG1 Meeting #89, Hangzhou, China, May 15-19, 2017, 4 pages.
European Search Report dated Sep. 27, 2021 in connection with European Patent Application No. 21 17 2094, 14 pages.
Examination Report under Section 18(3) in connection with United Kingdom Patent Application No. GB 1709070.5, 2 pages.
Intellectual Property India, "Examination report under sections 12 & 13 of the Patents Act," dated Feb. 22, 2022, in connection with Indian Patent Application No. IN201937054100, 6 pages.

* cited by examiner

| LCH | Traffic type / service | LCH Priority | Num #1 | Num #2 |
|---|---|---|---|---|
| LCH#1 | URLLC | 1 (higher) | ○ | × |
| LCH#2 | eMBB | 2 (lower) | ○ | ○ |

FIG.5

METHOD AND APPARATUS FOR SCHEDULING REQUEST IN WIRELESS COMMUNICATION SYSTEM

CROSS-REFERENCE TO RELATED APPLICATION

This application is a continuation of U.S. patent application Ser. No. 16/002,914 filed on Jun. 7, 2018, which is based on and claims priority under 35 U.S.C. § 119 to United Kingdom Patent Application No. 1709070.5 filed on Jun. 7, 2017 in the United Kingdom Intellectual Property Office, the disclosures of which are herein incorporated by reference in their entirety.

BACKGROUND

1. Field

The present disclosure relates to a wireless communication system, and more particularly, to method and apparatus for scheduling request in wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, such as 5G, a mobile station (MS) or User Equipment (UE) is in direct or indirect communication with at least one Base Station (BS), known as eNB or gNB in 5G. Upon arrival of new data in the UE on a Logical Channel (LCH), and observing certain priority rules amongst LCHs, a Buffer status report (BSR) is triggered, whereby the UE signals to the network, via the eNB, status information included in the BSR message. However, sometimes, there is insufficient resource (or no scheduled grant whatsoever) available on the UL-SCH channel for the UE to send a BSR message. In such instances, the UE may respond with a Scheduling Request (SR) message, to request the grant of additional resource.

SUMMARY

As explained, it is an aim of embodiments of the present disclosure to address the issue associated with behaviors in case of multiple SR triggers.

According to the present disclosure there is provided an apparatus and method as set forth in the appended claims.

According to the present disclosure, there is provided a method of operating a telecommunication network supporting a plurality of Scheduling Request, SR, configurations, whereby each of the plurality of SR configurations is associated with at least one Logical Channel, LCH, according to network conditions.

According to present disclosure, the network conditions include one or more of channel conditions, SR robustness and latency requirements.

According to the present disclosure, different PUCCH formats and/or parameters are used for each of the plurality of SR configurations, based on uplink channel conditions.

According to the present disclosure, if more than one SR is scheduled, the method further comprises determining a single SR to be transmitted from a User Equipment, UE.

According to the present disclosure, there is a counter associated with each scheduled SR, each counter having associated therewith a maximum value.

According to the present disclosure, the single SR to be transmitted is determined to be one of:
the SR corresponding to the LCH with the highest priority;
the SR corresponding to the most stringent LCH;
the SR corresponding to the LCH whose associated counter is about to expire, regardless of its priority;
the SR corresponding to the LCH whose data have been queuing up the longest; and
the SR with the lowest periodicity.

According to the present disclosure, after the UE receives a grant of resources, a Buffer Status Report, BSR, is transmitted from the UE, and wherein the BSR comprises information regarding:
Logical Channel Groups, LCGs, that are mapped to a numerology of the UL grant;
All LCGs, including those not relevant for the UL grant; or
LCGs that are mapped to the numerology of the UL grant, and a subset of LCGs which are not relevant for the grant but which have the highest priority.

Other features of the disclosure will be apparent from the description which follows.

According to a first aspect of the present disclosure, there is provided a method of operating a wireless communication system supporting a plurality of Scheduling Request, SR, configurations, whereby each of the plurality of SR configurations is associated with at least one Logical Channel, LCH, according to network conditions.

Preferably, changes in network conditions may be considered, particularly network conditions such as one or more of channel conditions, SR robustness and latency requirements.

Embodiments of the disclosure have advantages in that they permit improvements in scheduling SR in a scenario where multiple SR configurations are possible. This has an impact on latency and overall system performance and allows, in particular, higher priority traffic to be handled speedily.

Embodiments of the disclosure may be implemented in hardware or in software in UE and/or network equipment as required.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 shows a table of different Logical Channel types according to an embodiment of the present disclosure;

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for scheduling request in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
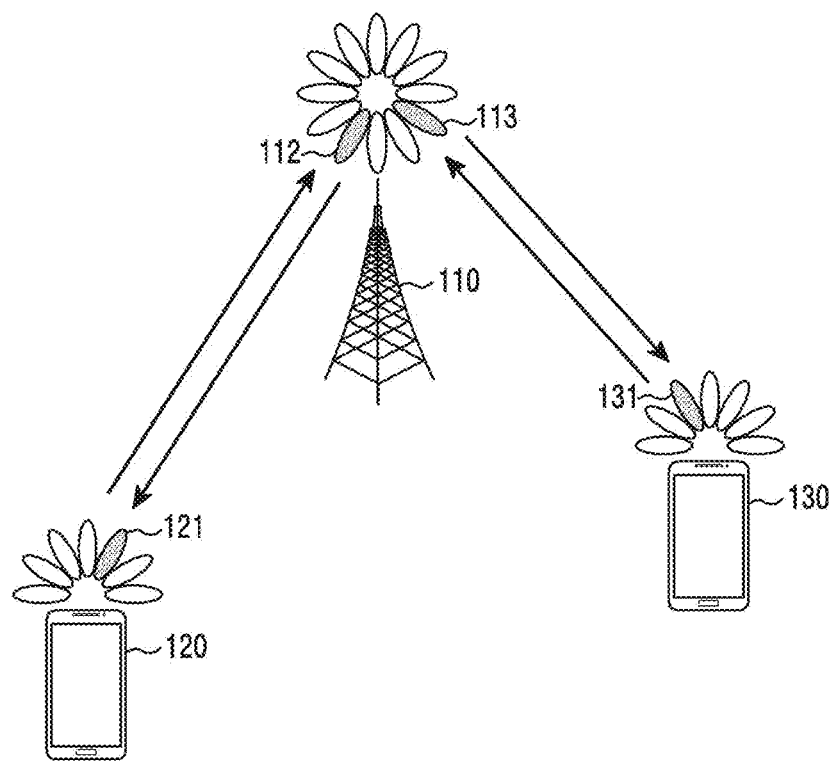
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal (or UE) 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC)

and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, Doppler spread, Doppler shift, average gain, average delay, and spatial Rx parameters.

Figure 2:
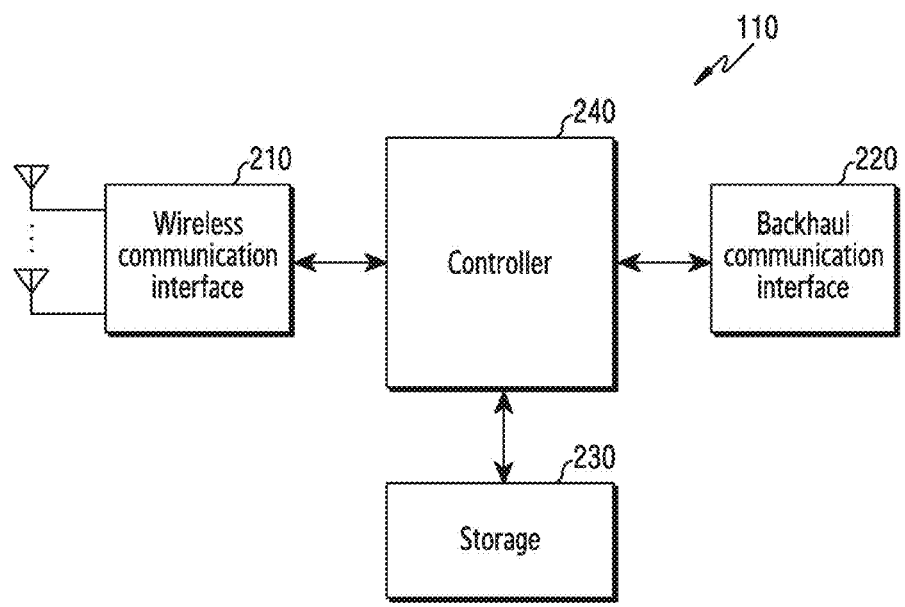
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array comprising a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may perform functions of a protocol stack that is required from a communication standard. According to another implementation, the protocol stack may be included in the wireless communication interface 210. To this end, the controller 240 may include at least one processor.

According to embodiments of the present disclosure, the controller 240 may control the base station to perform operations according to the embodiments of the present disclosure.

Figure 3:
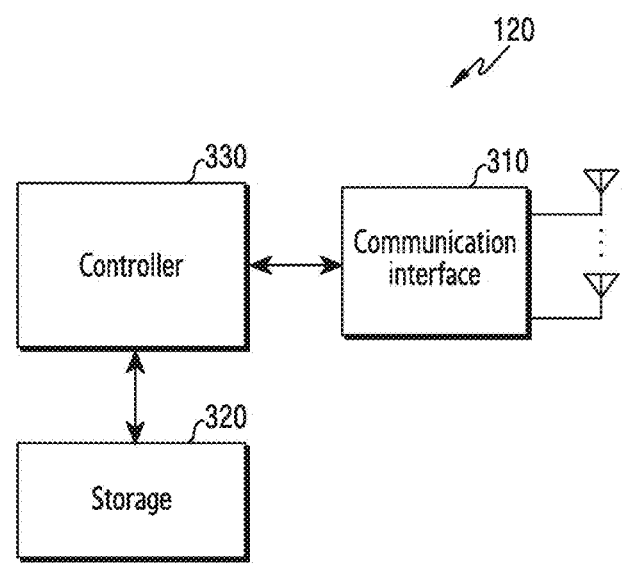
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array comprising a plurality of antenna elements. In the hardware side, the communication interface 310 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may perform functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to embodiments of the present disclosure, the controller 330 may determine a scheduling request (SR) configuration among a plurality of SR configurations based on a network condition, and control the communication interface 210 to transmit an SR associated with the determined SR configuration. Herein, each of the plurality of SR configurations corresponds to at least one logical channel (LCH). For example, the controller 330 may control the terminal to perform operations according to the embodiments of the present disclosure.

Figure 4:
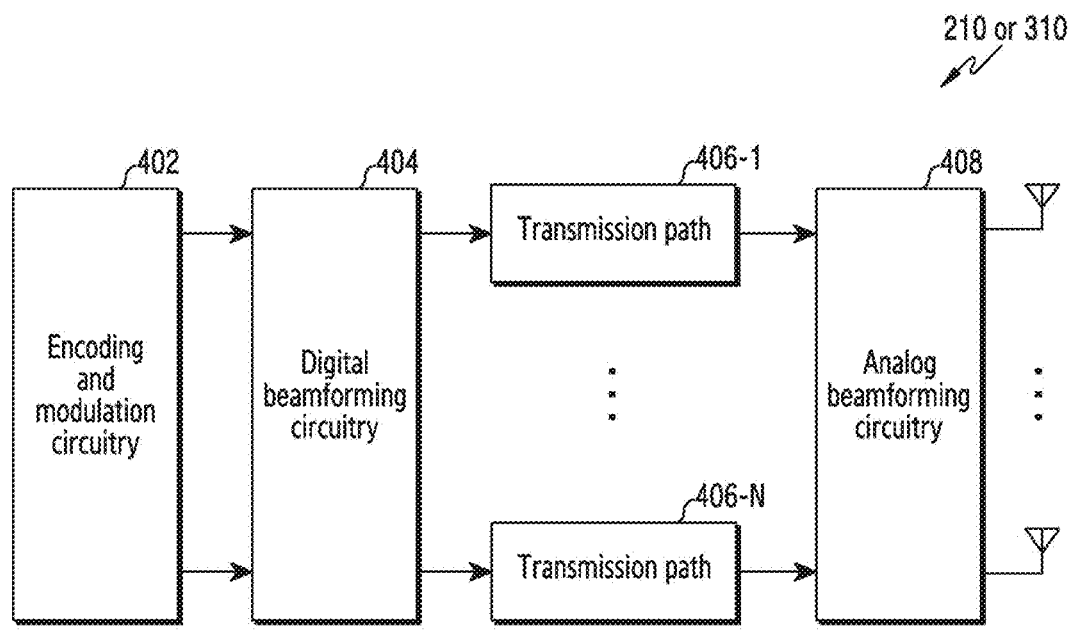
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

It has been agreed in standardization committees that for NR systems the UE should be configured with independent one-bit SR resources. These multiple SR resources (including their periodicity and time/frequency/space resources used) are configured by the network, with each configuration linked to a specific numerology. The UE will use the SR configuration based on the mapping between SR configurations available and LCH(s) configured (possibly grouped into Logical Channel Groups (LCGs) for purposes of BSR/SR triggering/reporting) for triggering the SR.

The gNB then infers the numerology used for the first PUSCH transmission based on the specific SR configuration used by the UE, allowing uplink grant on the Uplink Shared Channel (UL-SCH) to be given with appropriate size and physical layer numerology, matching the underlying Quality of Service (QoS) requirements. Additionally, Uplink (UP) latency improvement should be made possible because of the knowledge of different underlying numerology parameters (e.g. TTI value) of data in UE buffers.

In LTE—and it is expected this to be the case in NR as well—SR is transmitted when the UE does not have enough resource to send a Buffer Status Report (BSR) on UL-SCH. In other words, the triggers for BSR and SR are inextricably linked and so a BSR that triggers an SR may not be transmitted, since if a BSR is transmitted then no SR is needed. One exception is when BSR is transmitted repeatedly but its reception fails; expiration of a relevant BSR timer would then be interpreted as 'BSR sent but not received' and SR would then be triggered.

It is generally understood that in NR, SR will be triggered by a regular BSR (as in LTE), although in NR there may be more than one active SR. This means that the LCH/LCG that is determined to be the one triggering the SR is in fact the one that triggered the BSR and it is expected that the SR configuration to be used for SR transmission is the one linked to the LCH that triggered the BSR. In summary, it is envisaged that the NR network will provide via RRC signaling the number and parameters of different SR configurations, together with the mapping of LCHs to various SR configurations. As in LTE, it is the failure to transmit regular BSR which results in transmission of SR. The specific configuration used to transmit SR should be the one the LCH which triggered the regular BSR is mapped to.

It is possible to further anticipate scenarios where multiple SRs could be pending simultaneously. Embodiments of the disclosure focus on the cases where one SR can be sent and address ways of determining which SR to send in case of such a collision. Furthermore, embodiments of the disclosure address how adaptive tuning of SR parameters can help allow efficient operation of multiple SR configurations.

In NR, it has been agreed to have only one priority per channel per UE (the same as in LTE systems) despite the fact that a single LCH could be mapped to multiple numerologies. However, a feature of having multiple SR configurations is so that the choice of configuration can indicate UL grant type requested.

Assuming a basic mapping, as shown in FIG. 5, whereby a single Ultra Reliable Low Latency Communications Channel (URLLC LCH) is mapped to Numerology #1 (Num #1) and one single Enhanced Mobile Broadband (eMBB) LCH is mapped to both Num #1 and Numerology #2 (Num #2). It is likely URLLC will have higher priority and is configured accordingly with a '1' priority. As such, it would not be possible to indicate to the network arrival of new eMBB data if LTE design were adopted. Therefore, it is assumed that in NR BSR will be (or can be) triggered when new data arrives for LCH with a higher priority (than existing data) among all LCHs that are mapped to the same numerology/UL grant type/TTI. Therefore, it can be assumed that multiple SRs can exist in parallel.

Figure 6:
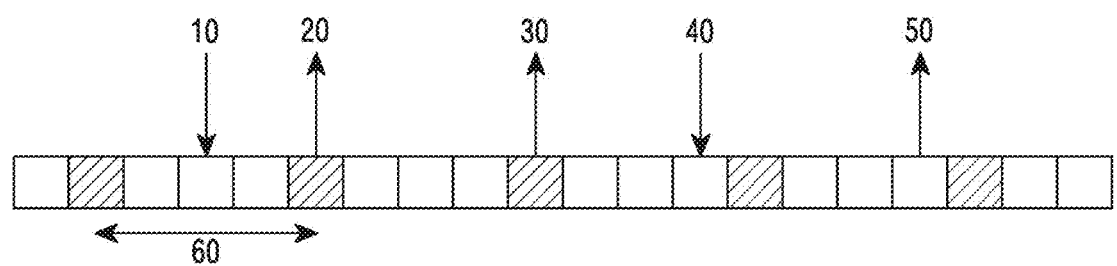
FIG. 6 shows timeslots and activity according to an embodiment of the present disclosure.

In LTE systems, until an UL grant is received, the SR is repeated up to a configurable limit determined by a counter. In FIG. 6, the shaded cells represent time slots where the counter may be incremented.

In FIG. 6, the SR period is denoted by time period 60. At 10, data arrives which triggers a BSR. However, there is no UL grant and so SR is triggered. At 20, SR is transmitted and the SR counter is incremented. At 30, SR is sent again and the counter is incremented again. The reason that a second SR is sent is that no grant was received in response to the SR sent at 20.

At 40, grant (e.g., UL grant) is received and a short time later, at 50, a transmission is made on UL_SCH which includes the BSR, which is now possible, since grant at 40.

If the counter reaches its limit and no UL grant has been received, then the UE performs Random Access, RACH, as attempts to get scheduled resources have failed. In LTE systems, the arrival of data having higher priority than the data already existing in the transmit buffers triggers SR.

In NR, however, one single counter may not be enough. In LTE, until an UL grant is received, the SR is repeated up to a configurable limit determined by a counter (SR_COUNTER). After this the UE performs RACH, as attempts to get scheduled have failed. Assume only one counter and only one dsr-TransMax value for NR. According to various embodiments of the present disclosure, the 'dsr-TransMax' indicates a maximum number of SR transmission count. Further assume that data for LCH A arrives and SR X is triggered. At the same time, or immediately afterwards, data for LCH B arrives and SR Y is triggered. A question is whether the single counter counts transmission attempts of both SR X and SR Y. If so, it is likely it will expire sooner and UE will have to RACH sooner than it would have had to with two separate counters. This may be solved by increasing the dsr-TransMax value. However, if SR Y is linked to low-latency data then extending the wait before RACH may not be idea good solution. Having only one counter complicates things and requires a number of decisions to be made where there is simply not enough data to make an informed choice. It is more practical to have separate dsr-TransMax values per SR configuration.

As such, the following will then happen:

One of the two configurations results in successful reception of SR, UL grant is allocated matching the successfully received SR configuration, BSR is sent containing data for all LCGs, and all counters are reset; or one of the two configurations reaches the maximum value of allowed retransmissions and the UE has to perform RACH. All the counters are reset.

As mentioned previously, as has been agreed in NR systems, there is a link between the SR configuration and the LCH that triggered it. This is because the gNB needs to know what kind of grant to give. Multiple SR configurations should ideally cover non-overlapping areas in the frequency-time grid and each configuration is linked to a specific numerology. It is, however, possible that different configurations may collide in time and it may be necessary to make a choice. Embodiments of the present disclosure address this problem.

Referring to FIG. 6, in LTE systems, following a successful SR (30), the first grant on UL-SCH is given (40); the UE usually includes in the following first transmission (50) the Buffer Status Report (BSR) of all the LCHs and not just the one that requested the SR; in LTE, LCHs are grouped into LCH groups (LCG) for the purposes of buffer status reporting. In NR, SR configuration is linked to a specific numerology; not all LCHs can be placed into the MAC PDU received for this LCG (in response to its SR).

Embodiments of the disclosure allow designs to be implemented which allow multiple SR flags to be raised simultaneously or to overlap in time. There are 2 resource types to be taken into account here: numerology requested by the UE for the UL grant (and linked to SR configuration used), and numerology used for SR transmission itself.

If different SR configurations use different resource types for SR transmission (e.g. different PUCCH parameters/formats), then it is likely that these transmissions have different chances of being successfully received. Combined with different values of the counter, dsr-TransMax, it is possible to allow independent operation of multiple SR configurations. In other words, for each SR configuration, the values of dsr-TransMax can be configured independently and operate independent counters as described in the following:
1. Use different PUCCH formats/parameters for different SR configurations, based on UL channel conditions:
   a. As a further refinement, use longer dsr-TransMax value for poor channel conditions. This allows a higher number of SR transmission attempts, assuming SR is not linked to a time-critical service. This can also be used for certain PUCCH formats, resulting in a more robust system to allow a higher probability of reception of SR for these case.
2. Use shorter dsr-TransMax values for low-latency cases.
3. Use shorter dsr-TransMax values for non-latency critical cases, since they will have been configured to have longer SR periods, or at least can be so configured.

Figure 7:
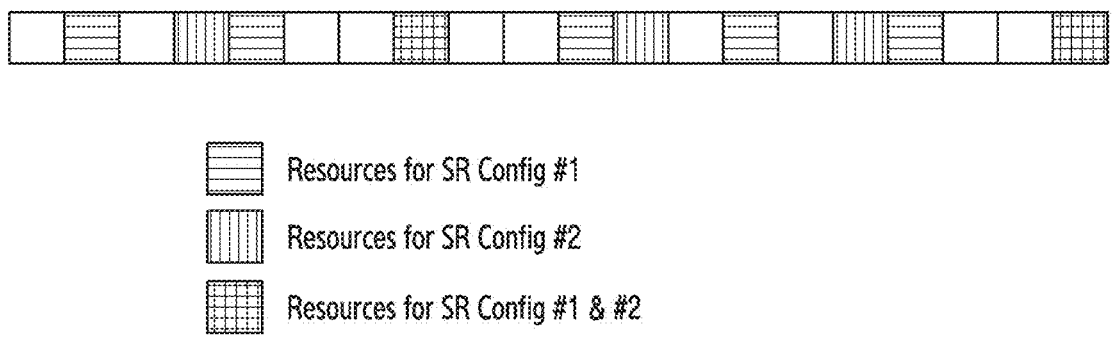
FIG. 7 shows resources associated with different SR configurations according to an embodiment of the present disclosure.

Embodiments of the disclosure further relate to the case where only one SR can be sent. This includes cases of UEs with single Tx/Rx chain (due e.g. to their physical construction), if configured with multiple SR resources in different frequency locations but overlapping in time domain, or when multiple SR resources are configured for the UE, but some of the SRs may share the same radio resources, as shown in FIG. 7, which shows SR resources for two configurations, #1 and #2. Each is periodic, with a different periodicity which occasionally overlaps, as shown.

If a choice of SR configuration has to be made, then the SR which satisfies one or more conditions may be sent. The particular conditions can vary depending upon network preferences or load, for example. One option is to send the SR corresponding to the LCH with the highest priority.

Another option is to send the SR for the most stringent LCH/LCG (e.g. lowest latency).

Alternatively, send the SR for the LCH/LCG whose counter is about to expire, regardless of its priority, since it is more likely to have to use RACH to gain access again very soon once the counter expires. These attempts to minimize the number of RACHs used.

As a variation to this scheme, send the SR for the LCH/LCG whose counter is about to expire regardless of its priority, as it is more likely to have to use RACH very soon, but only if PRACH space in the cell is heavily loaded, for instance if the load exceeds a certain configurable threshold.

As a further variation, send the SR for the LCH/LCG whose data have been queuing up the longest.

As a still further variation, send the SR with the lowest periodicity, as that LCH/LCG will have to wait the longest for the next chance to send an SR.

By use of the above options, it is possible to allow that the system operates with the desired characteristics and which favors certain operations over others. In particular, the counters associated with SR may be reconfigured from time to time by the network. This is generally done in a semi-static manner, rather than in a real-time manner to reflect network load and/or conditions. If only one of the SRs is sent and if the system supports multiple counters then only the counter for the configuration used is incremented.

Once one SR transmission is successful and the UE is allocated enough resource to send a BSR, all SR flags are cancelled and not just the one that was successfully received. Embodiments of the disclosure further specify the BSR content to be sent following successful receipt of UL grant:
Send buffer status of the LCG(s) that are mapped to the numerology of the obtained UL grant
Send buffer status of all LCGs, even those not relevant for this UL grant (i.e. those mapped to other numerologies) as the gNB will know this (based on the mapping of LCHs to numerologies which is configured by the network), and the extra information will be useful for scheduling other grant types
Send buffer status of LCG(s) that are mapped to the numerology of the UL grant, and a subset of LCGs which are not relevant for this grant but which have the highest priority; their data is close to being discarded; a combination of these conditions
Decision on which of the two solutions immediately above to go for could be refined based on: size of the MAC PDU; the padding available in the MAC PDU; loading in the contention-based (grant free) space (as grant free is supported in NR and can be used for BSR as alternative to scheduled grants); loading in the semi-persistent scheduling (SPS) space; a combination of these.

By use of embodiments of the present disclosure, it is possible to provide a management scheme for SR which recognizes and deals with different SR configurations and which provides a UE and other network elements operable in accordance with the management scheme.

Figure 8:
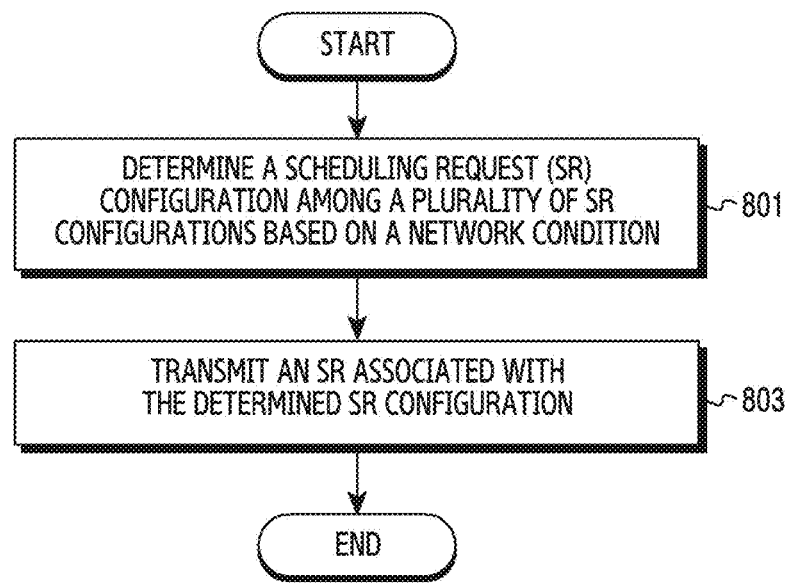
FIG. 8 illustrates a flow chart of operations implemented by a user equipment (UE) according to a various embodiments of the present disclosure.

FIG. 8 illustrates a flow chart of operations implemented by a UE according to a various embodiments of the present disclosure. FIG. 8 illustrates operations of the UE 120.

Referring to FIG. 8, in operation 801, the UE determines a scheduling request (SR) configuration among a plurality of SR configurations based on a network condition. Each of the plurality of SR configurations corresponds to at least one logical channel (LCH). The network condition comprises at least one of a channel condition, an SR robustness, or latency requirements.

According to the disclosure, different physical uplink control channel (PUCCH) formats or parameters are used for each of the plurality of SR configurations. To determine the SR configuration, the UE determines an SR configuration associated with a PUCCH format or parameter corresponding to the network condition. The PUCCH format or parameter may correspond to an uplink (UL) channel condition.

According to the disclosure, a maximum number of SR transmission count (that is, dsr-TransMax) is configured for each of the plurality of SR configurations. Different values of the maximum number of SR transmission count are configured for at least two of the plurality of SR configurations. To determine the SR configuration, the UE can determine an SR configuration associated with a maximum number of SR transmission count corresponding to the network condition. For example, the maximum number of SR transmission count corresponding to a first channel condition is longer than that corresponding to a second channel condition, wherein the first channel condition is worse than the second channel condition. For another example, the maximum number of SR transmission count corresponding to a first latency requirement is shorter than that corresponding to a second latency requirement, wherein the first latency requirement is higher than the second latency requirement.

In operation 803, the UE transmits an SR associated with the determined SR configuration. The SR comprises at least one of the SR corresponding to a LCH with the highest priority, the SR corresponding to the most stringent LCH, the SR corresponding to a LCH whose associated maximum number of SR transmission count is about to expire, regardless of its priority, the SR corresponding to a LCH whose data have been queuing up the longest, and the SR with the lowest periodicity.

Although not shown, the UE receives an uplink (UL) grant of resources as a response for the SR, and transmits a BSR using the resources. The BSR may comprise information regarding at least one of logical channel groups (LCGs) that are mapped to a numerology of the UL grant, all LCGs including those not relevant for the UL grant, and LCGs that are mapped to the numerology of the UL grant, and a subset of LCGs which are not relevant for the UL grant and have the highest priority.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
receiving, from a base station (BS) via radio resource control (RRC) signaling, a plurality of scheduling request (SR) configurations and configuration information associated with a mapping between at least one SR configuration and at least one logical channel;
identifying a logical channel for which a buffer status reporting (BSR) is triggered;

identifying a SR configuration corresponding to the logical channel among the plurality of SR configurations based on the configuration information;
based on identifying that a first SR counter for the SR configuration is smaller than a first maximum number of SR transmissions of the SR configuration, incrementing the first SR counter and transmitting a scheduling request to the BS; and
based on identifying that the first SR counter is not smaller than the first maximum number of SR transmissions, performing a random access procedure.

2. The method of claim 1, further comprising:
based on identifying that a second SR counter for another SR configuration of the plurality of SR configurations is smaller than a second maximum number of SR transmissions of the other SR configuration, incrementing the second SR counter and transmitting a scheduling request to the BS;
based on identifying that the second SR counter is not smaller than the second maximum number of SR transmissions, performing a random access procedure; and
based on identifying that the first SR counter is not smaller than the first maximum number of SR transmissions, or the second SR counter is not smaller than the second maximum number of SR transmissions, resetting both the first SR counter for the SR configuration and the second SR counter for the other SR configuration.

3. The method of claim 1,
wherein the plurality of SR configurations includes the SR configuration and another SR configuration,
wherein the SR configuration is associated with first PUCCH information and another SR configuration is associated with second PUCCH information,
wherein the first PUCCH information includes a first PUCCH format and at least one first PUCCH parameter, and
wherein the second PUCCH information includes a second PUCCH format and at least one second PUCCH parameter.

4. The method of claim 1, wherein the logical channel triggering the BSR corresponds to a logical channel with a highest priority among one or more logical channels in response to the BSR being triggered.

5. The method of claim 1, further comprising:
cancelling all pending SRs based on identifying that resources for transmitting the BSR corresponding to the SR configuration of the plurality of SR configurations are allocated.

6. The method of claim 1, wherein, for an ultra reliable low latency communication (URLLC) service, the RRC signaling associates with logical channels with different SR configurations.

7. The method of claim 1,
wherein the plurality of SR configurations includes the SR configuration and another SR configuration, and
wherein the SR configuration is associated with a first periodicity and the other SR configuration is associated with a second periodicity.

8. A method performed by a base station in a wireless communication system, the method comprising:
transmitting, to a user equipment (UE) via radio resource control (RRC) signaling, a plurality of scheduling request (SR) configurations and configuration information associated with a mapping between at least one SR configuration and at least one logical channel, wherein the plurality of SR configurations includes a SR configuration corresponding to a logical channel in which a buffer status reporting (BSR) is triggered;
receiving, from the UE, a scheduling request in response to a first SR counter for the SR configuration being smaller than a first maximum number of SR transmissions of the SR configuration; and
receiving, from the UE, a random access signal in response to the first SR counter not being smaller than the first maximum number of SR transmissions.

9. The method of claim 8,
wherein the plurality of SR configurations includes the SR configuration and another SR configuration,
wherein the SR configuration is associated with first PUCCH information and the other SR configuration is associated with second PUCCH information,
wherein the first PUCCH information includes a first PUCCH format and at least one first PUCCH parameter, and
wherein the second PUCCH information includes a second PUCCH format and at least one second PUCCH parameter.

10. The method of claim 7, wherein the logical channel triggering the BSR corresponds to a logical channel with a highest priority among one or more logical channels in response to the BSR being triggered.

11. The method of claim 7, wherein, for an ultra reliable low latency communication (URLLC) service, the RRC signaling associates with logical channels with different SR configurations.

12. The method of claim 7,
wherein the plurality of SR configurations includes the SR configuration and another SR configuration, and
wherein the SR configuration is associated with a first periodicity and the other SR configuration is associated with a second periodicity.

13. A user equipment (UE) in a wireless communication system, the UE comprising:
a transceiver; and
at least one processor coupled to the transceiver and configured to:
receive, from a base station (BS) via radio resource control (RRC) signaling, a plurality of scheduling request (SR) configurations and configuration information associated with a mapping between at least one SR configuration and at least one logical channel;
identify a logical channel in which a buffer status reporting (BSR) is triggered;
identify a SR configuration corresponding to the logical channel among the plurality of SR configurations based on the configuration information;
based on identifying that a first SR counter for the SR configuration is smaller than a first maximum number of SR transmissions of the SR configuration, increment the first SR counter and transmit a scheduling request to the BS; and
based on identifying that the first SR counter is not smaller than the first maximum number of SR transmissions, perform a random access procedure.

14. The UE of claim 13, wherein the at least one processor is further configured to:
based on identifying that a second SR counter for another SR configuration of the plurality of SR configurations is smaller than a second maximum number of SR transmissions of the other SR configuration, increment the second SR counter and transmitting a scheduling request to the BS;

based on identifying that the second SR counter is not smaller than the second maximum number of SR transmissions, perform a random access procedure; and based on identifying that the first SR counter is not smaller than the first maximum number of SR transmissions, or the second SR counter is not smaller than the second maximum number of SR transmissions, reset both the first SR counter for the SR configuration and the second SR counter for the other SR configuration.

15. The UE of claim 13,
wherein the plurality of SR configurations includes the SR configuration and another SR configuration,
wherein the SR configuration is associated with first PUCCH information and the other SR configuration is associated with second PUCCH information,
wherein the first PUCCH information includes a first PUCCH format and at least one first PUCCH parameter, and
wherein the second PUCCH information includes a second PUCCH format and at least one second PUCCH parameter.

16. The UE of claim 13, wherein the logical channel triggering the BSR corresponds to a logical channel with a highest priority among one or more logical channels in response to the BSR being triggered.

17. The UE of claim 13, wherein the at least one processor is further configured to cancel all pending SRs based on identifying that resources for transmitting a BSR corresponding to one of the plurality of SR configurations are allocated.

18. The UE of claim 13, wherein, for an ultra reliable low latency communication (URLLC) service, the RRC signaling associates with logical channels with different SR configurations.

19. The UE of claim 13,
wherein the plurality of SR configurations includes the SR configuration and another SR configuration, and
wherein the SR configuration is associated with a first periodicity and the other SR configuration is associated with a second periodicity.

20. A base station in a wireless communication system, the base station comprising:

a transceiver; and
at least one processor coupled to the transceiver and configured to:
transmit, to a user equipment (UE) via radio resource control (RRC) signaling, a plurality of scheduling request (SR) configurations and configuration information associated with a mapping between at least one SR configuration and at least one logical channel, wherein the plurality of SR configurations includes a SR configuration corresponding to a logical channel in which a buffer status reporting (BSR) is triggered;
receive, from the UE, a scheduling request in response to a first SR counter for the SR configuration being smaller than a first maximum number of SR transmissions of the SR configuration; and
receive, from the UE, a random access signal in response to the first SR counter not being smaller than the first maximum number of SR transmissions.

21. The base station of claim 17,
wherein the plurality of SR configurations includes the SR configuration and another SR configuration,
wherein the SR configuration is associated with first PUCCH information and the other SR configuration is associated with second PUCCH information,
wherein the first PUCCH information includes a first PUCCH format and at least one first PUCCH parameter, and
wherein the second PUCCH information includes a second PUCCH format and at least one second PUCCH parameter.

22. The base station of claim 17, wherein the logical channel triggering the BSR corresponds to a logical channel with a highest priority among one or more logical channels in response to the BSR being triggered.

23. The base station of claim 17, wherein, for an ultra reliable low latency communication (URLLC) service, the RRC signaling associates with logical channels with different SR configurations.

24. The base station of claim 17,
wherein the plurality of SR configurations includes the SR configuration and another SR configuration, and
wherein the SR configuration is associated with a first periodicity and the other SR configuration is associated with a second periodicity.

* * * * *

UNITED STATES PATENT AND TRADEMARK OFFICE
CERTIFICATE OF CORRECTION

PATENT NO. : 11,395,316 B2
APPLICATION NO. : 16/680391
DATED : July 19, 2022
INVENTOR(S) : Tesanovic It is certified that error appears in the above-identified patent and that said Letters Patent is hereby corrected as shown below:

On the Title Page

Column 1, item (30), Line 1, "1709070" should read --1709070.5--.

Signed and Sealed this
Twenty-seventh Day of September, 2022

Katherine Kelly Vidal
*Director of the United States Patent and Trademark Office*